Oct. 11, 1966 R. C. O'BRIEN ET AL 3,278,003
READER-DECODER FOR TAPE-OPERATED TYPESETTING MACHINES
Filed June 11, 1965 3 Sheets-Sheet 1
FIG-1, FIG-2
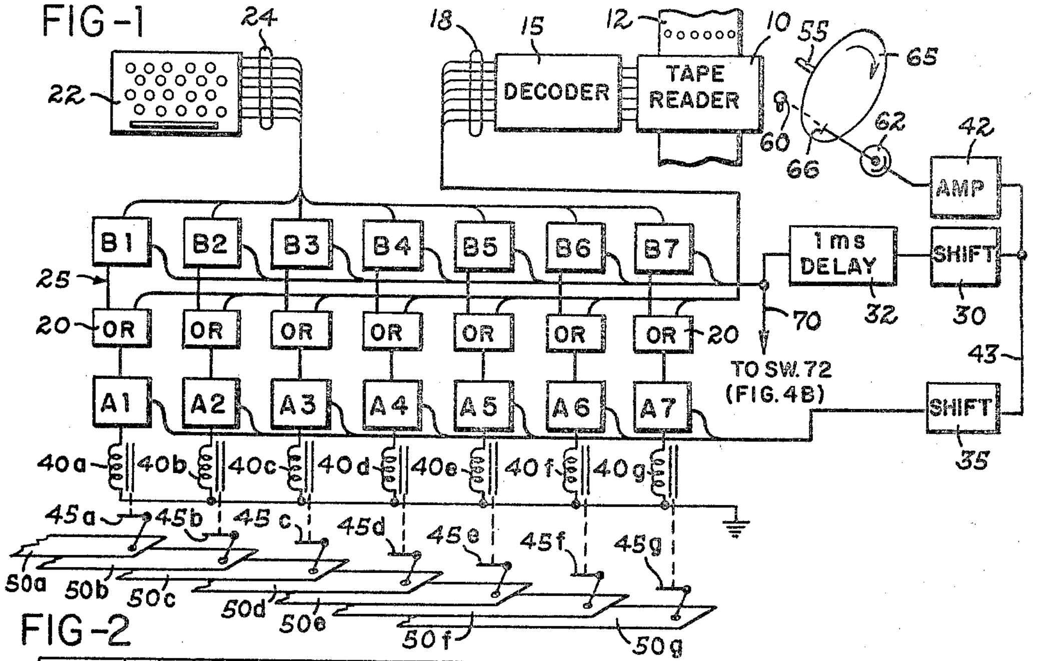
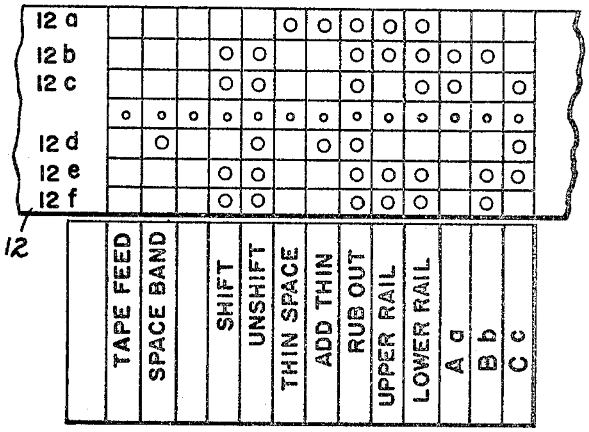
FIG-3
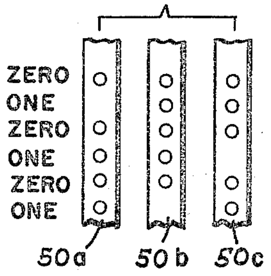
FIG-5
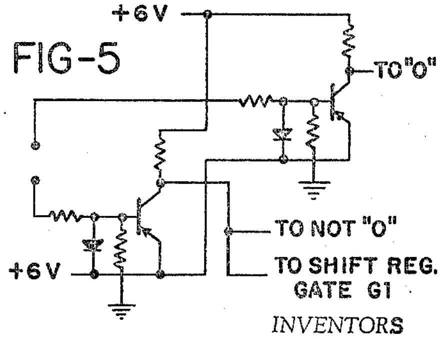
FIG-6
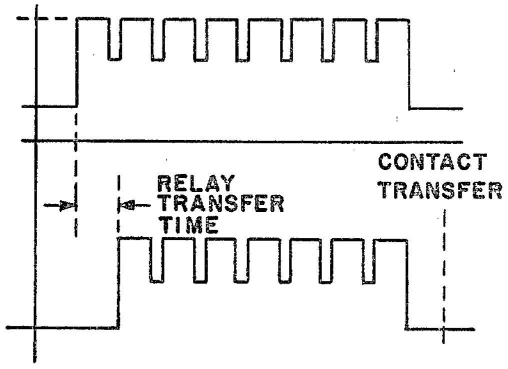
INVENTORS
RICHARD C. O'BRIEN,
NEIL SCHLEIFMAN &
MARVIN LAUT
BY
Marechal, Biebel, French & Bugg
ATTORNEYS

READER-DECODER FOR TAPE-OPERATED TYPESETTING MACHINES

Filed June 11, 1965 3 Sheets-Sheet 3

United States Patent Office 3,278,003

Patented Oct. 11, 1966

3,278,003

READER-DECODER FOR TAPE-OPERATED TYPESETTING MACHINES

Richard C. O'Brien, Huntington, Neil Schleifman, Kew Gardens, and Marvin Laut, Ossining, N.Y., assignors to Harris-Intertype Corporation, Cleveland, Ohio, a corporation of Delaware Filed June 11, 1965, Ser. No. 463,197
19 Claims. (Cl. 199—18)

This invention relates to apparatus for reading and decoding perforated tape for the purpose of operating typesetting machines.

The present invention is directed to the control of linecasting machines of the circulating matrix type, and to similar types of phototypesetting apparatus, for example as shown in United States Patent No. 2,391,021. It should be understood, however, that while the invention is described primarily in terms of its applications to such machines, the scope of the invention is intended to encompass all forms of typesetting machines which are capable of operation from standard perforated tape of the type presently used in connection with linecasting machines.

In the operation of these machines, signals of two general classes are required, namely those signals relating to selection of character mats and spacebands, and those signals relating to other typographical and machine functions. All of these signals are generally derived from a standard six-hole or six-channel perforated tape, and by use of such tape it is possible to obtain sixty-four different signal combinations. Sixty-two of these combinations or "code words" are used to control the operation of the machine, and the other two (usually "six holes" and "no holes") are reserved for error correction (i.e., "rub-out" code), and tape feed. These two last-mentioned signals are not passed on to the machine for any purpose and, therefore, it is desirable to minimize the time required in dealing with these codes. For purposes of explanation of the present invention, reference will be made to the six-digit Teletypesetter (or TTS) code which is used commercially.

Also, in order to achieve the highest possible production rate from circulating matrix machines under tape control, the tape preferably is decoded at a rate in excess of the response time of the escapement of any one mat channel. Therefore, delay of one signal must be introduced between two consecutive operations of the same escapement as would occur, for instance, in words containing double letters.

An important object of this invention is to provide a novel and simplified reader-decoder which can recognize tape feed and error correction signals, and cause the tape to pass through the reader at a faster rate when these signals are present, without the need of a special code to accelerate the tape feeding mechanism, and without the need of any special arrangement to slow the tape feed apparatus to its normal rate once these codes have been passed over.

Another object of the invention is to provide such a reader-decoder apparatus which is capable of recognizing the presence of the same character code in sequence, i.e., double letter codes, or the presence of function control codes, and which will automatically retard its rate of reading when such codes occur to enable the machine to perform the necessary operations in proper sequence, while still permitting a normal reading of the tape at a rate in excess of the response time of any one mat escapement mechanism in the machine.

A further object of the invention is to provide such a novel reader-decoder apparatus which can function with a standard commercially available tape reader, and which incorporates solid state circuits, particularly as recognition and decoding circuits, reducing to a minimum the number of contacts in the circuits, and providing a relatively inexpensive device which is reliable in operation.

Another object of the invention is to provide a novel decoding system, particularly adapted for the control of automatic typesetting machines, which is capable of recognizing the "add thin space" code when superimposed on the spaceband code, and translating this composite code word as two separate signals, whereby the typesetting machine will be caused to insert a thin space and a spaceband next to each other, and wherein an appropriate delay will be introduced to accommodate the extra operation of the machine which is thereby required.

An additional object of the invention is to provide a control system for automatic typesetting machines wherein the reader may be caused to read in reverse over the input tape, and to recognize the passage of "shift" or "unshift" codes in the tape, such that when the reader is subsequently caused to read in the normal direction and to control the typesetting machine, the machine will be in the proper shift or unshift mode.

An additional object of the invention is to provide a reader-decoder apparatus capable of accepting coded input, such as TTS tape, and translating the code information for use by a typesetting machine, and wherein the reader-decoder is so coupled to the automatic typesetting machine that the rate of operation is constant and at optimum speed, thereby obtaining optimum output from the typesetting machine.

Other objects and advantages of the invention will be apparent from the following description, the accompanying drawings and the appended claims.

In the drawings—

FIG. 1 is a block diagram illustrating the general arrangement of the reader-decoder apparatus provided by the invention, including provisions for alternate direct input from a suitable keyboard, and showing the input portion only of the mechanical decoding apparatus;

FIG. 2 is a diagram of a segment of six-channel perforated control tape such as commonly used for the automatic control of typesetting machines, and with identification of typical codes used in such tape including the ordinary codes for "rub-out," tape feed, and a few character mat identification codes;

FIG. 3 is a diagram showing the arrangement of the decoding input tape incorporated in the mechanical decoding apparatus;

Figure 4A:
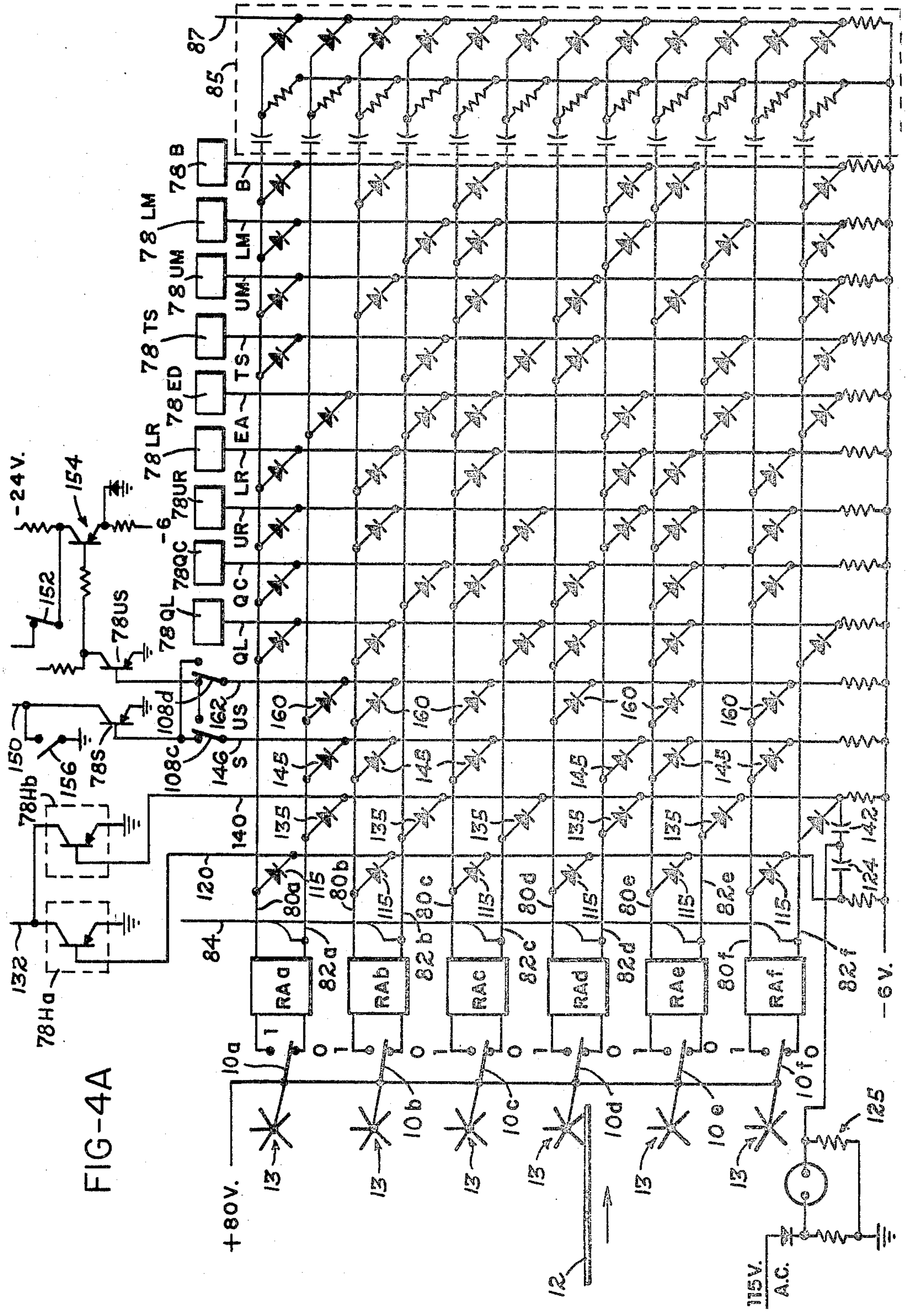
Figure 4B:
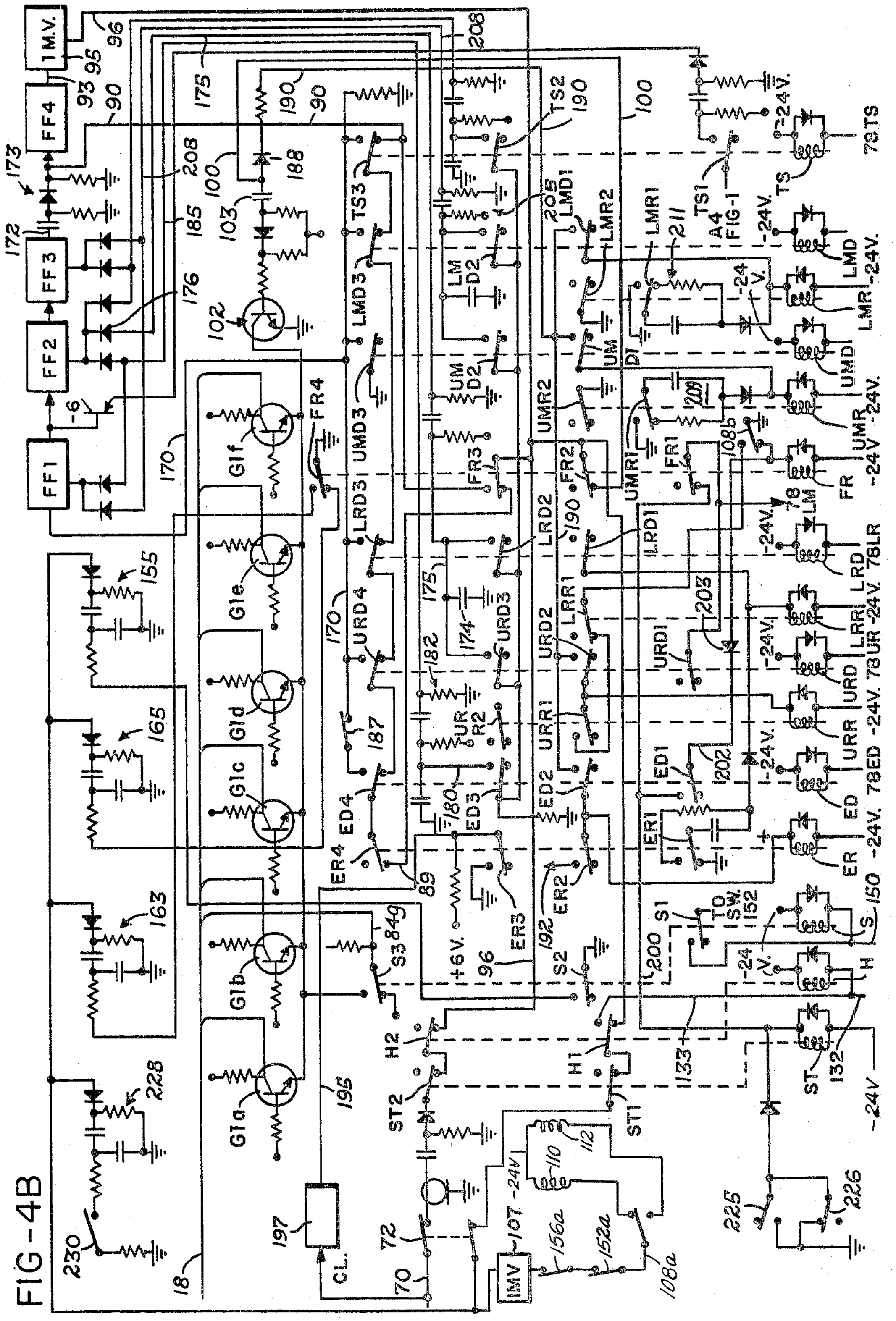

FIGS. 4A and 4B comprise a schematic electrical diagram of the reader-decoder control circuits which are adapted to energize and decode the signals obtained from the perforated control tape and to transmit code signals to the mechanical decoding apparatus;

FIG. 5 is a schematic diagram of a typical gate circuit shown in block form on FIG. 4A; and FIG. 6 is a chart illustrating the time relationship of the operation of certain parts in the decoder circuit.

Referring to the drawings, which illustrate preferred embodiments of the present invention, and particularly with reference to FIGS. 1 and 2, the reader-decoder apparatus incorporates a known form of perforated tape reader, capable of reading multiple bits of information simultaneously. For example, it can recognize the presence or absence of a perforation or other mark in each of several channels arranged lengthwise of the tape, with the portions of the channels forming one "code word" usually being in line crosswise of the tape as shown in FIG. 2. Thus, for example, the tape reader is shown schematically at 10, and the perforated tape 12 is shown in FIGS. 1 and 2, having six channels 12*a–f*, these channels also being appropriately labeled in FIG. 2.

The reader is of a type which is known in the art as a "star wheel" reader such as shown in United States Patent No. 3,027,072, or of an equivalent type, and it is capable of providing a distinct output according to the bit of information read from each channel. For example, there will be a switch for each channel, indicated as switches 10$a$–10$f$, shown in FIG. 4A, and these switches will contact one or the other of their output contacts (0 or 1) depending upon whether there is or is not a perforation for that channel in any code word being read. Because of its construction, wherein the star wheels 13 (one shown in FIG. 4A) have teeth of a pitch dimension corresponding to the spacing of code words on the tape, the reader does not exhibit any change in its output at any one of the switches 10$a$–10$f$ when the code bit information remains the same in successively read code words. Therefore, if the reader advances from one code word to the next, and these code words are the same, the reader does not exhibit any change at all in its output. This is a significant characteristic for certain decoding purposes, as will be explained.

The outputs of the reader 10 are passed through suitable electrical connections to a decoder and control circuit indicated generally at 15 in FIG. 1 and shown in detail in FIGS. 4A and 4B. This decoder in turn has seven output code connections indicated by the cable 18, which in turn are connected into a bank of buffer OR gate circuits 20.

The present invention also contemplates the possibility of utilizing certain parts thereof in conjunction with a typesetting machine which has a direct keyboard control. Thus, FIG. 1 shows schematically a keyboard 22 which incorporates a suitable encoding device (not shown) and having seven code output lines shown as the cable 24. This cable is connected into the "B" register circuits B1–B7.

The output from the "B" register circuits is provided by seven code output lines indicated by the general reference numeral 25. These lines run into the OR circuits 20, and thus also can feed the "A" register, A1–A7. A code set up in the "B" register can thus be transferred to a further register, hereinafter termed the "A" register, and formed by the seven flip-flop circuits A1–A7. This transfer is under the control of a shift gate circuit 30 which controls the circuits of the "B" register through a delay circuit 32, and similarly a shift control gate 35 controls the flip-flop circuits of the "A" register causing them to transfer the code set up in them through outputs into seven coding solenoids 40$a$, 40$b$, 40$c$, 40$d$, 40$e$, 40$f$ and 40$g$.

The shift control gates 30 and 35 receive an actuating pulse from a common photocell amplifier circuit 42, through a common input line 43. Thus, the delay circuit 32 causes the "B" register to delay its shift operation for a short time, for example, about one millisecond, to allow time for the "A" register first to shift the outgoing code from the "B" register and set up the solenoids 40$a$–$g$. Shift registers of this type are well known in the art of electronic controls, particularly handling digital code information. Details of these register circuits form no part of the present invention, therefore they are shown only schematically.

The solenoids 40$a$–$g$ control corresponding crank levers 45–$g$, which in turn control the position of seven mechanical decoding tapes 50$a$–$g$. Each tape will assume one of two positions, corresponding to the energized or deenergized state of its associated solenoid. Details of these decoding tapes and related apparatus are more fully described in copending application Serial No. 463,198, filed of even date herewith.

For purposes of an understanding of the functions of the reader-decoder controls and circuits, a brief description of the mechanical decoding apparatus is helpful. However, details of the novel features of this apparatus are not essential to such an understanding.

A typesetting machine of the circulating matrix type has a plurality of mat channels, each channel providing a supply of identical character mats. Each channel has an escapement for releasing a single mat from that channel into assemblying apparatus of the typesetting machine, and each such escapement may be operated by an actuating reed. The arrangement of such reeds and escapements is shown, for example, in United States Patent No. 3,042,188.

Movement of one of this reeds is caused by mechanical decoding apparatus which derives its power from a rotatably driven shaft, not shown. This shaft is, during normal operation of the machine, driven continuously at a constant speed, and one revolution thereof is considered to be one cycle of operation of the machine, during which one character mat can be released. The time for one cycle however can be substantially less than the response-actuating time for any one escapement mechanism.

This shaft also drives a conventional "light chopper" arrangement provided by a continuously illuminated lamp 60, a photocell 62, and a rotatable disc 65 therebetween which is preferably opaque and has a light transmitting slit 66 therein arranged to pass light to the photocell once for each revolution of the disc 65. The resultant pulse generated by the photocell is transmitted by amplifier 42, as shown in FIG. 1, at the rate of one pulse per cycle.

READER-DECODER CIRCUITS

The electrical pulse from photocell 62 is hereafter identified as a timing pulse. It passes, as described, to the shift register gates 30 and 35, being amplified by the photocell amplifier 42. This amplifier also has an output connection, as shown in FIG. 4, to a timing pulse input line 70.

In order to simplify the explanation of the circuits, the various decoding and control relays, and their corresponding switches where they appear in the drawings, will be identified in order to explain the scheme of references. First of all, there are a number of decoding relays which have their coils, normally deenergized, connected for energization through gate circuits controlled from appropriate output lines of the diode decoding matrix shown in FIG. 4A. These gate circuits are appropriately labelled in a manner to be described, and shown controlling related relay coils, some of which appear on FIG. 4B. These relays are as follows:

| Name | Coil Symbol | Switches |
|---|---|---|
| High Speed | H | H1, H2. |
| Shift | S | S1, S2, S3. |
| Upper Rail Detector | URD | URD1, URD2, URD3, URD4. |
| Upper Rail Relay | URR | URR1, URR2. |
| Lower Rail Detector | LRD | LRD1, LRD2, LRD3. |
| Lower Rail Relay | LRR | LRR1. |
| Elevate Detector | ED | ED1, ED2, ED3, ED4. |
| Elevate Relay | ER | ER1, ER2, ER3, ER4. |
| Add Thin Space | TS | TS1, TS2, TS3. |
| Upper Magazine Detector | UMD | UMD1, UMD2, UMD3. |
| Upper Magazine Relay | UMR | UMR1, UMR2. |
| Lower Magazine Detector | LMD | LMD1, LMD2, LMD3. |
| Lower Magazine Relay | LMR | LMR1, LMR2. |
| Forward-Reverse | FR | FR1, FR2, FR3, FR4. |

Certain contacts of these relays, as will be described, control the energization of further relays, solenoids, etc., which in turn govern certain functional operations of a linecasting machine, in a manner known to those skilled in the art. For example, switch S3 controls the output to the seventh stage of the "A" register, and thus translates the six digit code into seven digit code, in accordance with the reading of a shift or unshift code.

The decoding circuit outputs QL and QC control respectively the energizing of solenoid coils (not shown) which when either of them is energized, will actuate appropriate mechanisms in the machine to produce the corresponding quad left or quad center function.

The rail control relays URR and LRR and associated circuits control a rail actuating solenoid (not shown) through contacts URR1, to hold the rail control in the machine in the last selected position, either the upper rail or the lower rail.

The contacts of relays ED and ER govern the elevate control in the machine.

Relays UMD, UMR and LMD, LMR are connected respectively to the magazine selecting controls of the typesetter, and operate according to whether the upper magazine or lower magazine has been selected. This particular control is concerned with a circulating matrix type of machine which has two complete sets of mat channels, one above the other, commonly known as the upper and lower magazines. When a single magazine machine is used these detector circuits can be used for other purposes, such as a "quad right" control and a "tape stop" control. These and others of the detector and control circuits are further described later in this specification.

The reader-decoder circuits are illustrated with all of the relays and their respective switches in the normally deenergized condition, and for purposes of explanation it will be assumed that the reader is prepared to decode the strip of tape which serves as a record or memory of a line of composition. Thus the first code word will be presented to the star wheels of the reader, and the various switches 10*a*–10*f* will be positioned accordingly. It will be assumed that the first code thus presented to the reader is a character code, identifying a lower case letter. Switch 10*a* will thus engage its "0" contact, and the other switches will be in appropriate positions.

NORMAL CHARACTER SELECTION

For purposes of example it will be assumed that the first two words of the line of composition are "the possible." Thus the first code presented would be a "t," and the code for this letter is a hole in the sixth or "f" channel, and no holes in the other channels. Therefore, switches 10*a*–10*e* will all engage their "0" contacts, and switch 10*f* will engage its "1" contact.

FIG. 5 illustrates one of the decoding amplifier circuits which are adapted for connection to a corresponding one of the reader switches 10*a–f*. As will be apparent from FIG. 4A there is one of these circuits for each of the switches, and it will be apparent from FIG. 5 that there is a transistor amplifier circuit arranged for connection through the corresponding switch to a positive voltage source, identified as a positive voltage lead which is connected to all the reader switches. Each of these amplifier circuits is identified on FIG. 4A in accordance with its corresponding reader switch, and thus these amplifiers are labeled RA*a*–RA*f*. The transistor amplifier connected to the "1" contact of the reader switch in each instance has an output connection 80. There are, of course, six such output connections, and they are appropriately identified on FIG. 4A as 80*a*–80*f*.

Similarly, the transistor amplifier having a control connection from its base circuit to the "0" contact of the corresponding reader switch has an output lead 82, and these are therefore identified as the leads or matrix lines 82*a*–82*f* on FIG. 4A. In addition, each of the output leads 82*a–f* has a parallel output connection into a six line output cable 84, and the lines of this cable lead to the base circuits of six transistorized shift register input gates, shown on FIG. 4B and identified as the gate circuits G1*a*–G1*f*. Thus, each time one of the reader switches 10*a*–10*f* contacts its "0" contact, a signal will appear on the corresponding matrix line 82*a*–82*f* and on the corresponding line 84*a*–84*f* of the cable 84 to set up the appropriate register gate G1*a*–G1*f*. As long as the reader remains on the same code word, the same signal appears both in the decoding diode matrix and in the shift register input gate circuits, but these gate circuits do not transmit an output through the cable 18 to the "B" register.

Each of the diode matrix lines 80*a*–80*f* and 82*a*–82*f* extends to a decoding gate circuit 85, which functions, as will be described, also as an "AND" gate circuit to recognize the tape feed and rub-out codes, and as a double letter detection circuit. It will be noted that each line is connected to an input capacitor in this circuit, and thus so long as any one of the reader switches 10*a*–10*f* transfers from one of its contacts to the other during the reading of subsequent code words, there will be a pulse transmitted through at least one of these capacitors to the common output line 87 which transmits a set-up pulse to the double letter delay flip-flop FF1, presetting this flip-flop circuit to its "1" condition.

The actual transmission of the code information into the "B" register is accomplished in response to a timing pulse from the timing photocell 62. The time relationship of this pulse may be predetermined with respect to the desired angular position of shaft 55 by appropriate positioning of the light chopper disc 65 with respect to the shaft. The output pulse from the photocell passes from the amplifier 42 to the timing input line 70, and this line leads through the normally closed off-on switch 72 and the normally closed switch ST2 of the tape stop relay ST. Therefore, a circuit is completed to relay switch H2, and from its normally closed contact to a line 89 which leads through the normally closed contacts of relay switch FR3 to relay switch ER4.

The normally closed contacts of the relay switches ER4, ED4, URD4, LRD4, UMD3, LMD3 and TS3 are connected in a series circuit which is complete only when all of them are in their normal closed position as illustrated. If so, the pulse will pass through line 90 to the input of the control flip-flop FF4. This flip-flop circuit will shift to its "zero" state and thus transmit a pulse through its output line 93 into a one-shot multivibrator and amplifier circuit 95, of conventional construction. The multivibrator circuit will in turn transmit a "read" pulse via line 96 to the normally closed relay switch FR2, and thence through the read pulse output line 100. Thus, a read pulse is transmitted to the input transistor gate circuit 102, and particularly to its input capacitor 103, and this gate circuit transmits a shifting pulse into the emitters of each of the transistor gate circuits G1*a*–G1*f*.

Those of the gate circuits which have been set up by a signal from the reader amplifiers will in turn transmit appropriate code pulses through their respective leads of the output cable 18. At the same time, the read pulse passes through line 96 through the normally closed contact of relay switch H1, through normally closed relay switch ST1, and from this switch the pulse passes through line 104 to the one-shot multvibrator circuit 107, and its output is connected to the tape drive through the manual forward-reverse control switch 108*a*. A pulse from the multivibrator energizes the forward advancing coil 110 of the tape drive motor in the reader 10, and thus the tape will be drawn forward to present the next code word to the reader. The circuit for the reverse coil 112 is described later.

In the example given, where the first code word was the code for "t," the code thus set up in the "B" register will be 000001. In similar ways, the next code word for the letter "h," which is 000101, will be set up in the reader circuits, and when this code is transferred to the "B" register the timing pulse will also actuate the shift register control gate 30 to transfer the code for the letter "t" into the "A" register and thus set up the coding solenoids 40–40*g* to select the mat channel for "t." This will result in solenoid 40*f* being energized, while the others are all deenergized.

Similarly, when the next code word for the letter "e" is presented, it will be set up in the "B" register as the code for the letter "h" is transferred to the "A" register, and so on. After the letter "e," in the example, there is an interword space, and thus the code 000100 for a spaceband will be set up and handled in the same manner as the previous character selection codes.

DOUBLE LETTER DETECTOR

The operation of the double letter detector circuits is based upon the output from the decoding gate circuit of a set-up pulse to the delay flip-flop FF4. If a code appears successively on the tape, then none of the reader switches 10*a*–10*f* will switch contacts when the tape advances, and as a result there will be no set-up pulse through line 87 to FF4. Therefore, when the code is read for the second time (for example the second "s" in the word "possible") the first timing pulse for this second reading of the code word will pass through line 90 into FF4, but will merely cause it to transfer to its "1" state, since there was no set-up pulse to do this. Therefore, the machine will necessarily have to operate through another cycle before the next timing pulse passes through the same circuit to FF4, causing it to revert to its "0" state and actuate the multivibrator 95 to produce a read pulse.

Accordingly, the above-described circuits provide a means for delaying the actuating or read pulse of the second code word when a double letter code succession is detected. This allows sufficient time for the mat escapement to release a mat, reset, and release the second mat from the same channel.

HIGH SPEED READING CIRCUITS

As mentioned at the beginning of this specification, since the machine has no function to perform when a tape advance signal (000000) or a rub-out or error signal (111111) appears on the tape, it is desirable to have the reader pass over these code words at a substantially greater speed. For this purpose, separate AND gate circuits are arranged to control energization of the coil H of the high speed relay.

The circuit for the skip tape code gate is provided by the diodes 115, of which there are six connected respectively to the "1" contact output of the reader amplifiers, in other words, the diode matrix lines 80*a*–80*f*. These diodes are connected in parallel to the gate output line 120, which extends to the base circuit of a transistor gate 78H*a* (FIG. 4A). This transistor is normally non-conducting, since the gate output line 120 is at a positive potential by reason of conduction through at least one of the diodes 115. However, when all of the reader amplifiers are set up to indicate a "1" code, i.e., the skip tape code, then all of these diodes cease to conduct, the transistor gate 78H*a* conducts, and a circuit is completed through coil H from ground to the −24 v. bus, to energize the high speed relay.

A capacitor 124 is connected between line 120 and a high speed pulse generator circuit 125 which provides positive pulses at a rate substantially greater than the light chopper. For example, the circuit shown provides sixty positive pulses per second. These pulses are transmitted through capacitor 124 of the "and" gate output line 120, and through the transistor gate 78H*a*, which functions in this case as a pulse amplifier, to the output line 132 leading to coil H and its associated relay circuit 133, and to the normally open contact of relay switch H1.

Therefore, when the skip-tape code appears on the tape the high speed relay is energized and transfers its switches H1 and H2 from their normally closed contacts to their normally open contacts. This completes a circuit for high speed tape advancing pluses from the high speed pulse generator 125 through the transistor gate 78H*a* and through line 132, H1, to the input line 104 of the tape drive multivibrator 107. Switch H2 will open to break the timing pulse circuit input.

FIG. 6 is a diagram illustrating schematically the timing of pulses in this circuit. The top half of the diagram illustrates the conditions at the collector circuit of transistor 78H*a*, or in other words at the input to line 132. The bottom half of the diagram illustrates the conditions at the relay switch H1, or indirectly the transfer time of the high speed relay. When the transistor 78H*a* first begins to conduct, there will be a slight delay, due to the impendence of the coil H, before the high speed relay actually transfers. This time delay is illustrated in FIG. 6 as the relay transfer time.

The sixty c.p.s. positive pulses from the high speed pulse generator each tend to cut off the gate transistor. However due to the impedence of the relay coil H, before the relay can drop out, the base circuit of the transistor again goes negative as the decoding circuit pulls it negative between successive positive pulses. Therefore, the relay coil acts as a filter, and stays closed through the gap between the sixty positive pulses. However, it will be recalled that the transistor 78H*a* functions as a pulse amplifier as well as a control gate for the high speed relay. Therefore, as soon as any other code appears in the tape reader, one of the diodes 115 will begin to conduct since one or more of the lines 80*a*–*f* will go to a positive potential. This will immediately cut off the transistor 78H*a*, and the high speed pulse circuit will be broken immediately, the high speed relay will drop out with a slight delay caused by the delay circuit 133 and the normal circuits will be restored, including the timing input from the light chopper amplifier.

With the foregoing in mind, a detailed explanation of detection of the rub-out or correction code is unnecessary. The AND gate for this purpose includes six diodes 135 which are coupled between the reader amplifier output lines 82*a*–82*f* and a common gate control line 140 which extends to the base of the gate transistor 78H*b*. The collector circuit of this transistor is connected to the coil H of the high speed relays and to the output line 132 of the high speed pulse circuit, in parallel with transistor 78H*a*. Similarly, there is a parallel input from the high speed pulse generator 125 through a capacitor 142 to the gate control line 140. Therefore, the high speed circuit will respond and function in the same manner to a rub-out or correction code (111111) in the reader, and will switch to high speed operation to move the tape through the reader at high speed until the next code word appears.

It is important to note that, because of the amplifier gating function of the transistors 78H*a* and 78H*b* with respect to the input of high speed pulses, the supply of high speed pulses to the tape drive circuit is quickly shut off when another code appears in the reader. Thus the circuit shifts into high speed relatively slowly, but shifts back to slow speed relatively fast, so as not to skip over the next code appearing after the last skip-tape or rub-out code.

SHIFT CONTROL

It will be observed from the code that with the six digit code a large number of code words can identify two different characters. As is known in the art of typesetting machinery controls, the operator, and the machine, distinguishes which character is intended for a particular code word by use of the "shift" and "unshift" codes. For example, the code for the letter "t" is 000001 in the unshift position, and the code for the letter "T" is the same but in the shift position.

The decoding circuits provided by the present invention are capable of converting from the six digit input code, for example the TTS code, to a seven digit code in which the shift function is represented by presence or absence of a signal in the seventh output line of the cable 18 leading to the "A" register. This line is represented in FIG. 4B as the line 84*g*. The output through this line is controlled by opening or closing of the switch S3 of the shift relay.

When the shift code 011011 appears at the reader and set up in the switches 10*a*–10*f*, this code will be "recognized" by the decoding AND gate circuit comprising the appropriately connected diodes 146; all of them will cease to conduct, and the shift control line 147 will drop in potential to cause the transistor gate 78S to conduct and energize the coil S of the shift relay. Immediately upon energizing the S relay, the contact S3 shifts to connect the output into the seventh stage of the "A" shift register, relay switch S1 transfers to complete a circuit through line 150 and the coil of the relay S from the normally closed manually operated unshift switch 152 (FIG. 4A) and through that switch from holding amplifier 154, which is normally biased to conduct. Thus, without waiting for the next pulse from the light chopper input 70, relay switch S2 causes a shift pulse to be generated by the circuit 155, which in turn causes the multivibrator circuit 107 to send a stepping pulse to the coil 110 of the reader. The reader therefore steps to the next code, and the shift relay S remains energized, so that there is an output to the seventh stage of the "A" register for all subsequently read codes, until an unshift code (011111) appears in the reader.

Switches 152 and 156 also have contacts, marked respectively **152*a* and 156*a* in the input line from the multivibrator 107 to the actuating coils of the reader. Therefore, any time either of these switches is manually operated, corresponding contacts 156*a* or 152*a* are open to prevent a driving or advancing pulse from the multivibrator 107** from moving the reader to the next code. This circuit arrangement is useful in another respect.

If the reader is on a character code, manual operation of either of these switches will permit the light chopper pulses to pass in the usual way through line 70, through line 90, to FF4, and the resultant output from the multivibrator 95, through line 96, will send a pulse through line 100 and amplifier 102 to the gate circuits G1*a*–G1*f*, which in turn will control the decoding relays on the typesetting machine, causing the appropriate channel to discharge a single mat. This pulse, as previously explained, also causes the reader to read the next code, but since the advancing circuit to the reader is opened, the same code is read again, and the operation repeats.

Therefore, merely by holding either of these switches manually, an operator can cause the machine to empty an entire channel of the magazine. Obviously, this feature can be used for every channel available in the magazine by providing a section of input tape having appropriate codes for each channel, and therefore the operator may quickly empty the entire magazine, or any selected part of it, if he desires to do so for any reason.

At that time, the diodes 160 which are arranged to form an AND gate responsive to the unshift code, will all cease to conduct, for reasons previously explained, and the control gate transistor 78US will conduct by reason of a more negative potential appearing on the unshift control line 162. This will cut off the latching amplifier 154, thereby deenergizing the relay S, and it will drop out, changing the switches S1, S2 and S3 to their normal condition. The next pulse from the light chopper input will cause the reader to step to the following code, and thereafter there will be not further output to the seventh stage of the "A" shift register until a shift code next appears.

As a result, the reader-decoder handles the shift and unshift codes in essentially the same manner as other character codes, and immediately sets up the seventh digit of the output code accordingly, without any further delay in the reading operation. For the sake of convenience, the manually operated switch 152 can be moved from its normally closed position by an operator monitoring the device, thereby causing the typesetting machine being controlled to revert to the unshift position as it is set up for shift operation. A normally open switch 156 similarly is connected in parallel with relay switch S1 and the control input from the gating amplifier 78S. Therefore, closing of switch 156 will cause the shift relay to be energized and latch in as previously described.

TAPE REVERSE

It is desirable to provide for running the tape in reverse through the reader, for example if it is desired to reread a portion of the tape and set the corresponding type matter over. For that purpose, the forward-reverse relay FR is provided, controlling corresponding relay switches FR1, FR2, FR3 and FR4. It has already been noted that switch FR2 normally connects the read pulses from line 96 and the multivibrator 95 into the line 100. When the FR relay is energized, switch FR2 opens to break this connection, thus the read pulses are not transmitted to the read input gate 102. Relay switch FR3 transfers to its normally open position, thereby connecting line 90 directly to the relay switch H2, and bypassing the series circuit of relay switches such that the light chopper pulses can pass directly from switch H2 into the flip-flop FF4. At the same time, transfer of relay switch FR4 to its normally open contact will cause a pulse to be generated from the pulse generator circuit 163, passing to the multivibrator 107 and thence to the reader.

The forward-reverse switch, manually operated, is provided with several sets of contacts. This switch is referred to by the general reference numeral 108 and its contacts **108*a* have previously been described as, in the forward position, completing the tape drive circuit from the multivibrator 107 to the forward or advancing coil 110 of the tape drive. The contacts 108*b* are located in the supply circuit of the relay FR, and when this switch is moved to the reverse position contacts 108*b* will complete an energizing circuit through relay FR. At the same time, contacts 108*c* and 108*d* are connected in reverse fashion between the decoding output lines 152 and 162 and the associated gating amplifiers 78S and 78US. In the reverse position, therefore, the decoding lines are connected in inverse fashion of these two gate circuits, so that reading a shift pulse will cause the device to transfer to the "unshift" mode, and vice versa. Therefore as the tape is read "backwards," the shift or unshift mode of operation will be preserved, such as upon starting again in forward operation the shift control will be in the proper condition. At the same time, the transfer of switch 108*b* from its forward contact removes the ground connection from relay switches URR1 and LRR1, such that the upper rail relay URR and the lower rail relay LRR will not be disturbed by reading of the detected upper rail or lower rail codes. When the FR relay is deenergized, by switching to the forward position of switch 108, relay switch FR4 will transfer to its normally closed contact and complete a ground circuit to a pulse generating circuit 165, which will in turn send a pulse to the multivibrator 107**, stepping the tape reader to the next code, on which reading will commence.

FUNCTION CONTROL DELAY

There are a number of operations of the typesetting machine which cannot be performed within one cycle of operation in response to a command from the tape reader. For example, as mentioned the cycle time between successive timing pulses can be in the order of eighty to ninety milliseconds. A number of the mechanical operations of the typesetting machine cannot be completed within such a relatively short interval.

Accordingly, the present invention provides for automatic delay, preferably variable delays, in response to the appearance of certain code words at the reader. Before explaining the particular delay functions, the general scheme of delay circuits will be described. Noting that all timing pulses from the light chopper amplifier 42 must pass through the series circuit comprising the relay switches ED4, URD4, LRD4, UMD3, LMD3 and TS3 before they can pass to the control flip-flop FF4, movement of any one of these switches off its normally closed contact will break this normal timing pulse circuit. Each of these switches are of the double-pole type and their normally open contacts are connected in parallel to a timing delay line 170 (FIG. 4B). This line is connected to direct the timing pulses into the first stage FF1 of a three stage binary counter, comprising the cascade connected flip-flops FF1, FF2 and FF3.

This counter provides a pulse "sink" in which a predetermined number of timing pulses can be effectively "lost" before there is an output from the parallel timing pulse output line 172 which leads from the output of FF3 through the diode isolating circuit 173 to the line 90. Therefore, if the light chopper output is diverted into the pulse sink counter, several timing pulses will pass into this counter before there is an output to the control flip-flop FF4, which in turn will provide an output to cause a read pulse, as previously explained. It might be noted that FF4 is normally preset to its "one" state when the function code first appears at the reader switches.

Certain functions may require more time than others, and the present invention provides for shorter and longer time delays as the case may require. Thus, the relay switches LRD2 and URD3 are all connected to ground, and are all normally in an open condition as shown in FIG. 4B. When either of these switches is moved to its normally open contact, a pulse circuit is completed causing the capacitor 174 to create an output pulse through line 175 and the OR gate diode 176 to preset FF2 to its "one" state.

As a result, the "read" pulse that was decoded (either as a lower rail or upper rail code) and caused either of switches URD3 or LRD2 to close, also preset FF4 to its "one" state. Energizing of either of those relays then also diverts the pulses from the light chopper input pulse 70, through the relay switches URD4 or LRD3, to the input of FF1, and the shift pulse thereafter will cause an output from FF3 through line 172 and thence to line 90 and FF4, causing it to send an output pulse to the one-shot multivibrator 95, and that pulse goes to the one-shot multivibrator 107 which actuates the reader to step it to the next code.

When an elevate code is decoded, the relay ED is energized and relay switch ED3 transfers from its normally open contact to complete a circuit through line 180 which causes the resistor capacitor network 182 to send a pulse through line 185. This pulse is coupled, through appropriate diode OR gates, to preset FF1 and FF2. Essentially the same sequence occurs as before, except that the delay is shorter in time by one pulse. However, the light chopper pulses are diverted by relay switch ED4 into line 170 and these diverted pulses must pass through the elevate stop switch 187 before reaching the input line 170 to FF1. If switch 187 is open, the reader will stop at the elevate code, but if this switch is closed, then after five pulses have passed to the counter stages, the next pulse will cause FF4 to pulse the one-shot multivibrator 95, and its output pulse through line 96 and relay switch FR2 and the read pulse line 100 will also pass through the diode 188 into line 190, which has a common connection to the relay switches ER2, ED2, URD2, LRD2, UMD1 and LMD1. The pulse passing through line 190 and, at this time through relay switch ED2, energizes the coil of the elevate relay ER. This causes relay switch ER2 to transfer and a holding circuit is completed through line 192 to a switch (not shown) on the delivery slide of the typesetting machine. This holds the ER relay energized during the elevate operating sequence of the typesetting machine. Relay switch ER4 opens, breaking the light chopper input to line 90, and the normally open relay switch ER3 transfers to its ground connection, completing a circuit through line 195 to an elevate register 197, which is merely one stage of a shift register. This register is transferred to its "on" condition by the pulse through line 195, and the next pulse from the light copper circuit will return the register to its "off" condition. This sequence provides adequate time for the elevate operation of the typesetting machine, and assures that the delivery slide on the machine is prepared to receive the next assembly of matrices, since relay ER is held energized until the slide returns to open the delivery slide switch and breaks the hold connection through line 192.

With respect to the elevate operation, there is one other point that should be noted. The relay switch ED1, normally open, will complete a circuit from the tape stop relay ST through line 200 to the delivery slide switch. Line 200 continues to the normally closed contact of relay switch FR1. Therefore, when the relay FR is energized to cause the apparatus to read the tape in reverse, switch FR1 will be open, and the manually operated switch 108*b* will be in the reverse position, energizing relay FR. This also completes a ground circuit through line 202 and diode 203 (connected to the coil of relay FR) through switch ED1 to the tape stop relay ST. Therefore, when an elevate code is detected in operation, the transfer of relay switch ED1 will stop reading of the tape.

This assures that, reading in reverse, the apparatus will read over the tape one line at a time, and stop at each elevate code, giving the operator an opportunity to monitor the operation. It will be recalled, as previously explained, that during reverse reading the shift and unshift codes are read "backwards" to keep the typesetting machine in the proper shift or unshift mode of operation.

A shorter delay is provided for carrying out the function of changing magazines, i.e., transferring between upper magazines and lower magazines on a typesetting machine which is equipped with more than one magazine. When either the upper magazine or lower magazine codes are detected, the decoding matrix will produce a signal to the corresponding control mat circuits 78UM or 78LM, and the corresponding relay UMD or LMD will be energized. For purposes of explanation it will be considered that relay UMD is energized. This causes relay switch UMD3 to open, breaking the light chopper pulse input to line 90 and FF4. Relay switch UMD2 transfers from its normally open connection to complete ground circuit into the capacitor-resistor pulsing network 205, which in turn transmits a pulse through line 208 to preset FF1 and FF3 to the "one" state. As a result, there is a three cycle delay before the next output from the one port multivibrator 195 and the resultant pulse through line 196 and line 100 passes through line 190 and relay switch UMD1 to the coil of the upper magazine relay UMR. This transfers relay switch UMR2 to complete a ground connection to the upper magazine solenoid (not shown) on the typesetting machine. At the same time, closing of relay switch UMR1 transfers a ground connection in the delay circuit 209 from the resistor to the capacitor in that circuit. The discharge of the capacitor through the coil of relay UMR provides sufficient time (for example approximately 150 milliseconds) to assure that the upper magazine solenoid actuates.

The reading of the lower magazine code, energizing the detector relay LMD, the resultant transfer of relay switch LMD2 to initiate the presetting of the pulse sink counter, and the subsequent energization of the lower magazine relay LMR is essentially the same. Transfer of relay switch LMR2 to its normally open contact will complete a ground circuit to the lower magazine solenoid (not shown), and likewise there is a capacitor-resistor delay circuit 211 controlled by relay switch LMR1 to delay the opening of the LMR relay.

ADD THIN SPACE

Another feature of the present invention is the provision of decoding control which reads the "add thin space" code (100100) and translates it into two separate codes, namely the spaceband code (000100) and the thin space code (100000). When the add thin space code is decoded, this sends a signal to the gate circuit 78TS, energizing the coil of relay TS. Transfer of relay switch TS2 to its normally open contact causes a pulse to be transmitted by the resistor-capacitor network 215 through line 216, thereby presetting FF2 and FF3 to the "one"

state. This sets up the pulse sink counter for a one cycle delay. The next following pulse via the light chopper input 70 is diverted through relay switch TS3 into FF1. This changes FF1 to its "one" state, and this causes the following amplifier 218 to transmit a signal via line 220 to the resistor-capacitor network 222, which emits a pulse to the normally open contact of relay switch TS1. This contact is now engaged by the plate of relay switch TS1. The second following pulse into FF1 causes an output from FF3 into lines 172 and 90, thereby causing FF4 to send a read pulse through the medium of the one-shot multivibrator to the gate circuit 102 via line 100.

There is also a connection from the output amplifier 61*d* to the normally closed contact of TS1, and the common output from the blade of TS1 leads, via the cable 18, to the buffer input of the "A" register. Normally, outputs from 61*d* are therefore connected to the fifth stage of the "A" register through relay switch TS1.

In the present instance, however, the output from the multivibrator 95 passes through line 90 and 100 to the read pulse output gate 102, as a direct result of the aforementioned transfer output of FF1 and the resultant pulse output of FF3. Therefore, with the spaceband signal having already been sent to the "A" register, the remainder of the code, namely the add thin space, is transferred because of this read pulse into the "A" register as the spaceband code is stepped out. The result is that although the decoder reads only the add thin space code, it translates that code into the spaceband code and then the thin space code, in that order, causing the typesetting machine to "drop" first a spaceband, and then a thin space.

SUMMARY

Various other decoding functions are available from the apparatus, but these do not require, under normal circumstances, any delay in operation. Therefore, the output from the associated decoding lines are shown as extending to the quad left control gate 78QL, which in turn controls the quad left relay (not shown) on the typesetting machine, and similarly the quad center output gate 78QC is connected to control a quad center relay (not shown) on the typesetting machine. In similar fashion, the bell control gate 78*b* is connected to control the bell relay on the typesetting machine, and if desired, this relay can include contacts in the circuit of the tape stop relay ST.

Various other features of the device include sensing switches 225 (normally open) and 226 (normally closed) which can be arranged through appropriate sensors to respond to a jam in the tape feed mechanism, or absence of a tape in the reader. Thus, the normally open tight tape switch 225 can be closed in response to a predetermined tension in the record tape, to energize the coil ST of the stop tape relay. Similarly, switch 226 can be held away from its normally closed contact by presence of tape in the reader, and thus it will be arranged to close when the tape runs out, thereby energizing the tape stop relay. There is also provision for causing the reader to step, one step at a time, under manual control. For this purpose, a resistor-capacitor pulse network 228 is connected to the multivibrator 107, and this network will emit a single pulse in response to closing in a normally open manually operable switch 230.

While the form of the apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A control for automatic operation of typesetting machines from a code record such as a perforated tape, comprising a reader adapted to complete different combinations of circuit connections in accordance with different multi-digit code words on the record, a decoder having input connections from said reader corresponding to the possible digits available in the record to form code words, a feedback output connection from said decoder to said reader for transmitting a stepping signal to present the next code word on said record to said reader, means controlling said feedback connection operable in timed relation to the machine being controlled for causing stepping signals in said decoder feedback connection at a rate corresponding to the functioning of said machine, a high speed control circuit governed by said decoder and normally maintained in an inoperative condition, an output connection from said high speed control to said reader for transmitting stepping signals at a substantially greater rate than the normal stepping signals from said decoder, and circuit means in said decoder responsive to a plurality of successively occurring code words which do not require an operation of the machine and connected to activate said high speed circuit for causing said reader to read said control record at a greater rate as long as such plurality of code words continues to be presented to said reader.

2. A control for automatic operation of typesetting machines from a code record such as a perforated tape, comprising a reader adapted to complete different combinations of circuit connections in accordance with different multi-digit code words on the record, a circuit decoder having input connections from said reader correponding to the possible digits available in the record to form code words, a feedback output connection from said decoder to said reader for transmitting a stepping signal to present the next code word on said record to said reader, means controlling said feedback connection operable in timed relation to the machine being controlled for causing stepping signals in said decoder feedback connection at a rate corresponding to the cyclic functioning of said machine, a pulse sink circuit arranged to receive stepping signals selectively from said decoder feedback connection, circuit means in said decoder responsive to predetermined code words and combinations of words which cause an operation of the machine requiring more than one operating cycle to complete, and control means operated by said circuit means and connected to actuate said pulse sink circuit means for diverting a predetermined number of stepping signals from said feedback connection causing a corresponding delay in advancement of said reader to the next code word.

3. A control for typesetting machines as defined in claim 2, wherein said decorder circuit means includes a detector circuit responsive to the occurrence of a code word twice in succession and an operating connection to said control means for causing said pulse sink circuit to divert at least one stepping signal from said feedback connection.

4. A control for typesetting machines as defined in claim 2, wherein said decoder means includes detector circuits responsive to a number of function control code words, and operating connections from said detector circuits to said control means for causing said pulse sink circuit to divert different amounts of stepping signals from said feedback connection according to the particular function control determined by a code word being read.

5. A control for typesetting machines as defined in claim 2, wherein said decoder means includes a detector circuit responsive to an elevate code, and a control circuit operative from said elevate code detector circuit and arranged to deactivate said feedback connection until the machine completes its elevate function.

6. In a typesetting machine of the circulating matrix type in which individual character mats and interword spacebands are assembled corresponding to the characters and interword spaces making up a line of composition, a control for automatic operation of such machine from a perforated record tape having a plurality of code words formed thereon to identify the characters, interword spaces, and operating functions of the typesetting machine to form lines of composition, said tape including certain code words which are to be passed over and other code words representing the function of feeding the perforated tape without operation of the machine; said control comprising a tape reader having a plurality of circuit connections corresponding to twice the number of digits available in the code tape to make up code words whereby each digit is at all times represented by one of two connections completed to indicate the presence or absence of a perforation at each digit position; a decoder circuit having input connections from all of said circuit connections of said reader whereby every possible code word available on said tape is relatable by a different combination of circuit connections to said decoder for thereby establishing certain circuit combinations representing a character which has been erased and other certain circuit combinations representing a tape feed instruction; an operating member on said typesetting machine driven at a predetermined speed to establish the rate of operation at which mats can be released by said machine; means connected to generate timing pulses according to the operation of said member; a circuit between said timing pulse generating means and said reader arranged to step said reader to the next code word at a rate corresponding to the operation of said member; an enabling circuit under the control of each of said certain circuit combinations in said decoder controlling the connection of said timing pulse generating means to said reader for normally advancing said reader in accordance with the rate of such timing pulses; a high speed pulse generator adapted to supply stepping pulses at a substantially greater rate than said timing pulse generating means; and a control between said enabling circuit and said high speed pulse generator arranged to supply pulses to said reader from said high speed generator instead of from said timer pulse generator means whenever either of said certain circuit combinations is completed.

7. A tape reading and decoding control for typesetting machines, comprising a multi character control tape reader capable of reading all the digits of a multi-digit code word simultaneously and of providing a distinct output indicating the nature of each digit and also being capable of exhibiting no change in output with respect to any digit when that digit remains the same in successively read code words, a decoder circuit means having input connections from said reader corresponding to all the available combinations of digits available to form code words in the record, drive means in said reader arranged to move a record tape therethrough reading successive code words, control circuit means controlling said drive means to advance the tape normally at a predetermined interval after reading a code word, a plurality of recognition circuits in said decoder circuit means adapted to provide different outputs in response to different predetermined codes in said reader and including output circuits from said decoder circuit means corresponding to said predetermined code works, and a reading speed control circuit including a feedback connection to said drive means arranged to control the functioning thereof to delay the advancement of said reader in response to reading of some of said code words and to accelerate the advancement of said reader in response to reading of predetermined others of said code words on the tape.

8. A control for typesetting machines as defined in claim 7, wherein said recognition circuits include circuits responsive to a tape feed code word and to an erase code word, and said reading spaced control circuit includes means for operating said drive means to advance the tape at a substantially faster rate than the normal tape feed interval to move such code words through said reader at an accelerated rate.

9. A control for typesetting machines as defined in claim 7, wherein said recognition circuits including an AND gate device operable in response to repetition of a code word in the tape and connected to cause said reading speed control circuit to delay the operation of said drive means to assure that the character directed is repeated by the machine.

10. A control for typesetting machines as defined in claim 7, wherein said recognition circuits include individual circuits responsive to code words instructing functional operations of the machine such as quadding, elevate, rail change, and magazine change, and connectitons between said individual circuits and said speed control circuit for delaying the advancement of said reader by an amount sufficient to permit the machine to complete the instructed operation.

11. A control for typesetting machines as defined in claim 7, wherein said recognition circuits include a unique circuit responsive to reading of an elevate code word, and connections between said elevate code circuit and said control circuit means operative to prevent further operation of said reader until the machine completes its elevate operation.

12. A control for typesetting machines as defined in claim 7, wherein said recognition circuits include a circuit responsive to the "add thin space" code, circuit means operative by said "add thin space" recognition circuit to divide the instruction into separate coded instructions for inserting a thin space and a variable interword space, and said reading speed control circuit including circuit means responsive to said "add thin space" recognition circuit to delay advancement of said reader until both operations are performed.

13. In a typesetting machine of the circulating matrix type in which individual character mats and interword spacebands are assembled corresponding to the characters and interword spaces making up a line of composition; a control device for automatic operation of such machine from a record tape having a plurality of code words formed thereon to identify the characters, interword spaces, and operating functions of the typesetting machine to form lines of composition; said device comprising a tape reader having a plurality of output connections; a decoder circuit having input connections from said output connections of said reader and in which every possible code word available on said tape is relatable by a different combination of circuit connections to said decoder for establishing unique output circuit combinations representing character mats and spacebands to be selected and for causing certain functional operations of the machine; an operating member on said typesetting machine driven at a predetermined speed to establish the rate of operation at which successive mats can be released by said machine; means connected to generate timing pulses according to the operation of said member; a circuit between said timing pulse generating means and said reader arranged to step said reader to the next code word at a rate corresponding to the operation of said member; an enabling circuit under the control of each of said output circuit combinations in said decoder controlling the connection of said timing pulse generating means to said reader for advancing said reader in accordance with the rate of such timing pulses; a recognition circuit responsive to the "add thin space" code, and control circuits operated by said recognition circuit to cause said machine first to release a spaceband and then to release a thin space.

14. A control device as defined in claim 13, wherein said control circuits include connections providing for separating the "add thin space" code word into two separate code words identifying a spaceband selection and a thin space selection and also including means for delaying the operation of said reader until both selections have been made.

15. A tape reading and decoding control for typesetting machines, comprising a reversible record tape reader capable of reading all the digits of a multi-digit code simultaneously and of providing a distinct output indicating the nature of each digit, a decoder circuit means having input connections from said reader corresponding to all the available combinations of digits available to form code words in the record, reversible drive means in said reader arranged to move a record-tape therethrough reading successive code words, control circuit means controlling said drive means to advance the tape normally in a forward direction at a predetermined interval after reading a code word, a plurality of recognition circuits in said decoder circuit means connected to provide different outputs in response to different predetermined codes in said reader and including output circuits from said decoder circuit means corresponding to said predetermined code words, a reading speed control circuit including a feedback connection to said drive means arranged to control the functioning thereof, a reversing control connected to cause said drive means to move the record tape selectively through said reader in a reverse direction and including one of said recognition circuits arranged to stop the reader on a predetermined code word when said reversing control is in operation, and means incorporated in said reversing control to prevent operation of the machine by said decoder circuit means during a reverse reading operation.

16. A control as defined in claim 15, wherein said one recognition circuit is responsive to a line ending code such as an elevate code, whereby said reader is arranged during reverse operation to read over all code words identifying one complete line of composition and stop at the end of reading each complete line.

17. A control as defined in claim 15, including recognition circuits for shift and unshift codes, and a reversing connection for said shift and unshift recognition circuits operable with said reversing control to cause shift signals to produce an unshift output and unshift signals to produce a shift output for maintaining the decoder in proper shift or unshift mode during reverse reading.

18. In a typesetting machine, a control device for automatic operation of such machine from a record tape having a plurality of code words formed thereon to identify the characters, interword spaces, end of lines, and other operating functions of the typesetting machine to form lines of composition; said control device comprising a reversible tape reader having a plurality of output connections corresponding to the digits available in the code tape to make up code words whereby each digit is at all times represented by connections completed to indicate the presence or absence of a perforation at each digit position, a decoder circuit having input connections from all of said reader output connections and a plurality of recognition circuits whereby the code words available on said tape are relatable by a different combination of recognition circuit connections in said decoder to establish output circuits representing the different code words and including a specific recognition circuit for a code such as an elevate code indicating the end of a line, means on said typesetting machine driven at a predetermined speed to establish the rate of operation at which successive mats can be released by said machine and connected to generate timing pulses, a circuit between said timing pulse generating means and said reader arranged to step said reader to the next code word at a rate corresponding to the operation of said machine, an enabling circuit under the control of said output circuit connections in said decoder controlling the feedback of timing pulses to said reader for normally advancing said reader in accordance with the rate of such timing pulses, a selectively operable reversing control for said reader including control circuit means connected to drive said reader to read the tape in reverse fashion, means responsive to said reversing control for inhibiting said decoder output circuits, and means governed by said reversing control arranged to stop said reader on each said code representing an end of a line.

19. A tape reading and decoding control for typesetting machines, comprising a multi-character control tape reader capable of reading all the digits of a multi-digit code word simultaneously, a decoder circuit means having input connections from said reader corresponding to the different digits available to form code words in the record, drive means in said reader arranged to move a record tape therethrough reading successive code words, control circuit means controlling said drive means to advance the tape at a predetermined interval after reading a code word, a plurality of recognition circuits in said decoder circuit means adapted a provide different outputs in response to different predetermined codes in said reader and including output circuits from said decoder circuit means corresponding to said predetermined code words, a reading control circuit including a feedback connection to said drive means arranged to control the functioning thereof in response to reading of a code word, manually operable switch means for disabling said feedback connection, and a manually operable control means arranged to cause said reader to repeatedly sense the same code word whereby a character identification code word can be transmitted a number of times over the corresponding output circuit of said decoder circuit means.

References Cited by the Examiner

UNITED STATES PATENTS 2,869,717 1/1959 Rossetto et al. -------- 199—18

DAVID KLEIN, *Primary Examiner.*